Figure 1:
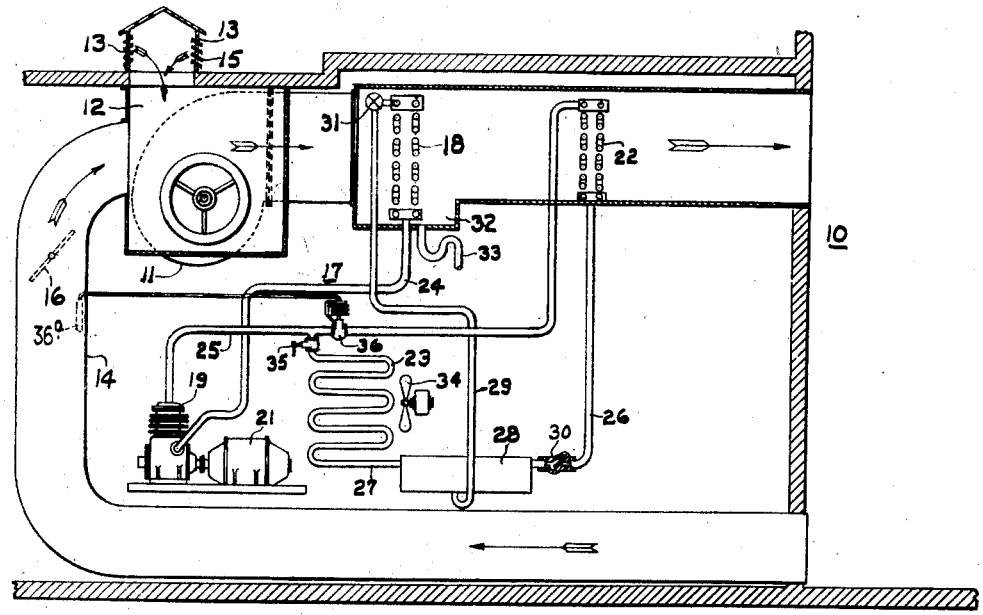

Jan. 8, 1935.                M. C. TERRY                1,986,863
               COOLING AND DEHUMIDIFYING SYSTEM
                      Filed Nov. 30, 1932

WITNESS

INVENTOR
MATSON C. TERRY.
BY
ATTORNEY

Patented Jan. 8, 1935

1,986,863

UNITED STATES PATENT OFFICE 1,986,863

COOLING AND DEHUMIDIFYING SYSTEM

Matson C. Terry, Detroit, Mich., assignor to Westinghouse Electric & Manufacturing Company, East Pittsburgh, Pa., a corporation of Pennsylvania Application November 30, 1932, Serial No. 645,070

4 Claims. (Cl. 62—6)

My invention relates to systems for cooling and dehumidifying air for enclosures in which people assemble or in which perishable articles are stored, and has for an object to provide a system of the character designated which shall operate more reliably and effectively and more efficiently than the systems of this character heretofore provided.

It has, heretofore, been proposed to treat the air for the enclosures in which people assemble by depressing the dew point of the air to a temperature substantially below the temperature which it is desired to maintain in the enclosure in order that such depression in temperature may reduce the vapor content of the air the required amount. In view of the fact that air treated in this way is saturated and at a substantially lower temperature than the temperature to be maintained in the enclosure, it has, heretofore been proposed to partly reheat this air so as to produce air for the enclosure which has a dry bulb temperature of substantially that which it is desired to maintain and which has a wet bulb temperature which will afford the most comfortable condition. Heretofore, in reheating the cooled air, it has been proposed to utilize steam heating coils. It has also been proposed to mix some of the relatively warm air from within the enclosure with the cooled saturated air, thereby increasing the dry bulb temperature of the treated air and reducing its relative humidity.

I have, therefore, conceived of an improved system which avoids mixing the contaminated air from the enclosure with the air which has been cooled and, in accordance with my invention, I utilize a portion of the condenser of the refrigerating system to effect this heating process. In this way, not only is the heating process effected, but a portion of the condenser is effectively cooled.

In practicing my invention, a quantity of air from outside of the enclosure or a mixture of such air with air withdrawn from the enclosure is conveyed in heat-exchanging relation with the heat absorbing element or evaporator of a refrigerating system for depressing its dew point. The treated air is then conveyed in heat-exchanging relation with a portion of the condenser or heat radiating element of the refrigerating system so that the dry bulb temperature of the air is raised with an incidental drop in relative humidity. In passing the cooled and saturated air over a portion of the condenser, only a fraction of the heat units extracted by the evaporator is returned to the saturated air to raise its dry bulb temperature. By properly determining the effective area of the condenser to be contacted by the saturated air, a desirable dry bulb temperature and relative humidity of air delivered to the enclosure may be obtained.

It is, therefore, a further object of my invention to provide a system for conditioning air wherein heat is removed from the air to be conditioned by passing it in heat-exchanging relation with the cooling element of a mechanical refrigerating system for depressing its dew point and, then, superheating the cooled air by passing it in heat-exchanging relation with a portion of the condenser of the refrigerating system whereby air is always delivered to the enclosure at a temperature and humidity which is well within the "comfort zone".

Figure 2:
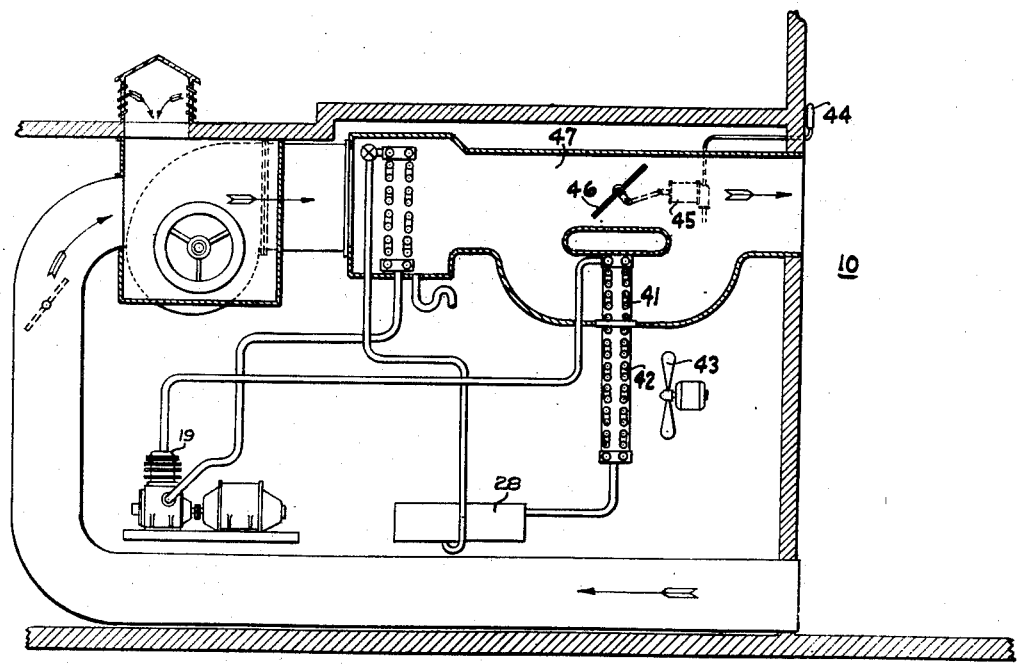

These and other objects are effected by my invention, as will be apparent from the following description and claims taken in accordance with the accompanying drawing forming a part of this application, in which:

Fig. 1 is a diagrammatic view of one form of air conditioning system arranged in accordance with my invention; and, Fig. 2 is a view, similar to Fig. 1, of another form of system.

Referring now to Fig. 1 of the drawing, I have shown my improved air conditioning system applied to a room or enclosure 10. Air for the enclosure is conveyed thereto by a fan 11, the inlet of which is connected to a chamber 12 into which air from outside of the enclosure is admitted through an opening 13. Fresh air from outside the enclosure may constitute the entire supply for the enclosure but in order that the load on the system may be reduced, I prefer to utilize a mixture of fresh air from outside the enclosure and return air from within the enclosure. A conduit 14 having one end connected to the enclosure and the other end with the mixing chamber 12 is provided for supplying return air to the chamber 12. Dampers 15 and 16 are located in the openings 13 and the conduit 14, respectively, in order that the proportions of fresh and return air may be varied.

The refrigerating apparatus, indicated generally by the reference numeral 17, includes an evaporator or cooler 18, a compressor 19 driven by a prime mover 21 and first and second condenser portions 22 and 23. The refrigerating system 17 operates on the well known compression expansion cycle. Refrigerant vapor is withdrawn from the evaporator 18 through a conduit 24 by the compressor 19 and is conveyed, at an increased pressure, through a conduit 25 to the first and second condenser portions 22 and 23 (connected in parallel), wherein the refrigerant is cooled and condensed. The liquid refrigerant then passes from the condenser portions 22 and 23 through conduits 26 and 27, respectively, to a receiving tank 28 and thence through a conduit 29 to the evaporator 18. Located in the conduit 29 is an expansion valve 31 which regulates the supply of condensed refriegrant to the evaporator in a manner well understood in the art.

Air which is conveyed by the fan 11 to the enclosure 10 is passed, first in heat exchanging relation with the evaporator 18 and, thence, in heat exchanging relation with the first condenser portion 22 before entering the enclosure 10. The dew point temperature of the air is reduced as it contacts with the evaporator 18 so that moisture is precipitated therefrom, which moisture collects in a sump 32 and is discharged through a drain 33.

The air, as it leaves the evaporator 18, may be in a substantially saturated condition and the temperature may be too low to be delivered to the enclosure 10 to provide comfortable conditions for occupants therein. In order that the dry bulb temperature may be increased and the relative humidity decreased, the air is then heated by coming in contact with the relatively warm condenser portion 22. It will be seen that only a portion of the heat abstracted by the evaporator 18 from the body of air conveyed to the enclosure is returned thereto by the first condenser portion 22, and that the second condenser portion 23 is cooled by some extraneous means, for example, a fan 34. This arrangement is necessary, as only a portion of the latent heat of condensation is necessary to reheat the saturated air discharged by the evaporator 18 to the dry bulb temperature within the so-called "comfort zone".

Distribution of refrigerant gas to the condenser portions 22 and 23 may be regulated by valves 35 and 36. These valves may be hand operated but I prefer to have valve 36 responsive to conditions in the enclosure for varying the amount of refrigerant gas delivered to the condenser portion 22 and therefore the heating effect thereof. Accordingly a thermostat 36a may be disposed in return conduit 14 and operatively connected to the valve 36 for opening and closing the same in response to decreases and increases in temperature of the air withdrawn from the enclosure 10. It will be apparent that other instruments may be substituted for the thermostat 36a if the valve 36 is to be operated in response to other conditions of the air in the enclosure.

In operation, regulation of the flow of gaseous refrigerant to the condenser portions 22 and 23 and the possibility of difference in temperature of the condenser portions may tend to produce pressure differences therein, so that cooled refrigerant might back up from the receiver 28 through conduit 26 to the condenser portion 22. To obviate this condition a check valve 30 is disposed in conduit 26, between the receiver 28 and condenser portion 22.

It will be seen that, by properly proportioning the heat exchange capacities of the first condenser portion 22 relative to the evaporator 18, conditioned air within the "comfort zone" can be obtained and that cooling of the first condenser portion 22 is incidentally effected.

In the embodiment shown in Fig. 2, both condenser portions are embodied in a single structure, one portion 41 being located in the path of the air being conditioned and the other portion 42 being located exteriorly of the air duct and cooled, for example, by a fan 43.

The condition of the air delivered to the enclosure 10 in this embodiment may be controlled for example, by a thermostat 44 operatively connected to a motor device 45 for positioning a damper 46. The damper 46 is disposed in a conduit 47 which by passes the condenser portion 41 and distribution of cooled air through the by pass conduit 47 and the condenser portion 41 is controlled thereby. An increase in temperature of the air in the enclosure 10 would be reflected in the thermostat 44 which causes the motor 45 to open the damper 46 slightly to permit more cooled air to mix with heated air from the condenser portion 41 before entering the enclosure. With a decrease in temperature of the air in the enclosure the reverse of this operation is true and less cooled air is contained in the mixture delivered to the enclosure.

It will be seen from the foregoing that I have provided an air conditioning system wherein the body of air to be treated is passed in heat exchanging relation with a volatile refrigerant, wherein the dew point temperature of the air is reduced, and subsequently, in heat exchanging relation with the liquefied refrigerant for absorbing heat therefrom, whereby a portion of the latent heat of condensation is utilized to increase the dry bulb temperature of the air and incidentally lower the relative humidity.

While I have shown a system of the direct contact type, that is, wherein the air makes contact directly with the evaporator and the condenser, it is to be understood that my invention is equally applicable to systems other than the direct contact type. Furthermore, while I have shown a refrigerating system of the compression type, my invention is equally applicable to other types.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In a system for cooling and dehumidifying air for an enclosure, the combination of a refrigerating system embodying an evaporator, a condenser having first and second portions connected in parallel at their inlet ends and at their outlet ends, and means for translating refrigerant fluid from the evaporator to the condenser, means for conveying air for the enclosure in heat-exchanging relation with the evaporator, whereby heat is removed therefrom and its dew point temperature depressed, means for conveying air thus treated in heat-exchanging relation with the first portion of the condenser for increasing its dry bulb temperature by returning to said air a portion of the heat removed by the evaporator, means for circulating extraneous medium for cooling said second portion of the condenser, means for conveying the air which has been in heat-exchanging relation with the first portion of the condenser to the enclosure, a valve for controlling the flow of refrigerant to said first portion of the condenser, and means responsive to temperature of the air in the enclosure for regulating said valve.

2. In a system for cooling and dehumidifying air for an enclosure, the combination of a refrigerating system including an evaporator, a condenser and a compressor for translating refrigerant from the evaporator to the condenser, said condenser embodying primary and secondary elements connected in parallel relation, valve means for varying the distribution of refrigerant to said condenser portions, means for cooling the secondary element of the condenser by circulating an extraneous fluid in heat-exchanging relation therewith, and means for circulating air for the enclosure, first, over the evaporator element of the refrigerating system for depressing its dew point temperature and, thence, over the primary element of the condenser in the refrigerating system for increasing its dry bulb temperature a portion of the temperature reduction effected by the evaporator.

3. In a system for cooling and dehumidifying air for an enclosure, the combination of an evaporator or cooling element, first and second condenser or heat dissipating elements connected in parallel at their inlet ends and at their outlet ends, means for translating refrigerant from said evaporator to said first and second condensers, means for conveying air for the enclosure in heat-exchanging relation with the evaporator, whereby its dew point temperature is depressed, means for conveying the air thus treated in heat exchanging relation with the first condenser element, whereby the dry bulb temperature of the air is increased and the first condenser element is cooled, means for circulating extraneous medium for cooling the second condenser element, means for supplying the air which has been in heat exchanging relation with the first condenser element to the enclosure and means responsive to a condition of the air in the enclosure for varying in inverse relation the amounts of refrigerant translated to said first and second condenser elements.

4. In a system for cooling and dehumidifying air for an enclosure, the combination of an evaporator or cooling element, first and second condenser or heat dissipating elements connected in parallel at their inlet ends and at their outlet ends, means for translating refrigerant from said evaporator to said first and second condenser elements, means for conveying air for the enclosures in heat-exchanging relation with the evaporator, whereby its dew point temperature is depressed, means for conveying the air thus treated in heat exchanging relation with the first condenser element, whereby the dry bulb temperature of the air is increased and the first condenser element dissipates heat from the refrigerant, means for circulating extraneous medium for cooling the second condenser element, means for supplying the air which has been in heat exchanging relation with the first condenser element to the enclosure and means responsive to a condition of the air in the enclosure for varying, inversely, the amount of heat dissipated by said first and second condenser elements.

MATSON C. TERRY.